(12) United States Patent
Ko et al.

(10) Patent No.: US 10,680,722 B2
(45) Date of Patent: Jun. 9, 2020

(54) APPARATUS AND METHOD FOR TRANSMITTING AND RECEIVING SIGNAL IN COMMUNICATION SYSTEM

(71) Applicant: Samsung Electronics Co., Ltd., Suwon-si, Gyeonggi-do (KR)

(72) Inventors: Il-Suk Ko, Seoul (KR); Dae-Young Lee, Seongnam-si (KR); Ohyun Jo, Seoul (KR); Jae-Hwa Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 691 days.

(21) Appl. No.: 15/264,166

(22) Filed: Sep. 13, 2016

(65) Prior Publication Data

US 2017/0085341 A1 Mar. 23, 2017

(30) Foreign Application Priority Data

Sep. 17, 2015 (KR) ........................ 10-2015-0131376

(51) Int. Cl.
*H04L 1/18* (2006.01)
*H04B 15/06* (2006.01)
*H04L 1/16* (2006.01)

(52) U.S. Cl.
CPC ........... *H04B 15/06* (2013.01); *H04L 1/1692* (2013.01); *H04L 1/1867* (2013.01)

(58) Field of Classification Search
CPC .. A61N 1/36; H04B 1/00; H04B 15/06; H04J 3/06; H04L 1/08; H04L 1/16; H04L 1/1692; H04L 1/1867; H04L 12/28; H04L 1/00; H04W 72/04; G11C 7/1093

USPC .......................................................... 714/749
See application file for complete search history.

(56) References Cited

U.S. PATENT DOCUMENTS

| | | | | |
|---|---|---|---|---|
| 4,238,739 A * | 12/1980 | Mosley | ................... | H03L 7/113 329/308 |
| 4,434,407 A * | 2/1984 | Healey, III | ................ | H03L 7/10 331/10 |
| 5,402,448 A * | 3/1995 | Marko | ..................... | H04B 1/44 370/514 |
| 5,463,627 A * | 10/1995 | Matsuoka | ............... | H03L 7/085 370/350 |
| 6,100,767 A * | 8/2000 | Sumi | ..................... | H03K 23/665 331/11 |
| 6,226,506 B1 * | 5/2001 | Welland | .................. | H03L 7/087 331/36 C |
| 6,807,405 B1 * | 10/2004 | Jagger | .................. | H04B 1/1036 455/296 |
| 6,961,546 B1 * | 11/2005 | Rofougaran | ........... | H03B 27/00 331/37 |

(Continued)

FOREIGN PATENT DOCUMENTS

WO 2008/018693 A1 2/2008
WO 2014-092366 A1 6/2014

*Primary Examiner* — Albert Decady
*Assistant Examiner* — Enamul M Kabir
(74) *Attorney, Agent, or Firm* — Jefferson IP Law, LLP

(57) ABSTRACT

A terminal in a communication system is provided. The terminal includes a transmitter configured to transmit a data frame including one preamble and a plurality of data blocks to another terminal by considering whether a preset signal is received, and a receiver configured to detect the preset signal from a signal received through an antenna while the data frame is transmitted by the transmitter.

20 Claims, 8 Drawing Sheets

(56) References Cited

U.S. PATENT DOCUMENTS

| | | | |
|---|---|---|---|
| 8,374,112 B2 | 2/2013 | Jung et al. | |
| RE46,142 E * | 9/2016 | Thi | H04B 3/23 |
| 2001/0001616 A1* | 5/2001 | Rakib | H03M 13/256 |
| | | | 375/259 |
| 2005/0249244 A1* | 11/2005 | McNamara | H04L 1/0025 |
| | | | 370/474 |
| 2006/0250882 A1* | 11/2006 | Choi | G11C 7/1078 |
| | | | 365/189.05 |
| 2007/0258535 A1* | 11/2007 | Sammel | G06K 7/0008 |
| | | | 375/262 |
| 2010/0118894 A1* | 5/2010 | Aweya | G06F 1/0328 |
| | | | 370/503 |
| 2010/0123493 A1* | 5/2010 | Griffiths | H03L 7/095 |
| | | | 327/157 |
| 2013/0316661 A1* | 11/2013 | Lee | H03B 5/1215 |
| | | | 455/75 |
| 2014/0078940 A1 | 3/2014 | Aggarwal et al. | |
| 2014/0086158 A1* | 3/2014 | Tavildar | H04L 1/1607 |
| | | | 370/329 |
| 2015/0078213 A1 | 3/2015 | Lim et al. | |
| 2015/0078214 A1 | 3/2015 | Lim et al. | |
| 2015/0163798 A1* | 6/2015 | Kwon | H04L 1/0029 |
| | | | 370/329 |
| 2015/0171903 A1 | 7/2015 | Mehlman et al. | |
| 2015/0280887 A1 | 10/2015 | Ko et al. | |

\* cited by examiner

APPARATUS AND METHOD FOR TRANSMITTING AND RECEIVING SIGNAL IN COMMUNICATION SYSTEM

CROSS-REFERENCE TO RELATED APPLICATION(S)

This application claims the benefit under 35 U.S.C. § 119(a) of a Korean patent application filed on Sep. 17, 2015 in the Korean Intellectual Property Office and assigned Serial No. 10-2015-0131376, the entire disclosure of which is hereby incorporated by reference.

TECHNICAL FIELD

The present disclosure relates to an apparatus and method for transmitting and receiving a signal in a communication system. More particularly, the present disclosure relates to an apparatus and method for transmitting and receiving a control signal related to reception of a data block.

BACKGROUND

A general communication system uses one of a positive acknowledgement (positive ACK) protocol and a negative ACK protocol in order to check whether a data block transmitted from a transmitting entity to a receiving entity is normally received in the receiving entity. For example, a communication system which is based on Wi-Fi uses a positive ACK protocol as shown in FIG. 1. The positive ACK protocol is useful in a channel environment where there are various noises. The communication system which is based on Wi-Fi has a half-duplex structure, a channel used in a transmitting entity and channels used in a receiving entity are time divided, so a data frame is transmitted and received through the time divided channels.

FIG. 1 schematically illustrates an example of a method of transmitting and receiving a signal using a positive ACK protocol in a general communication system according to the related art.

Referring to FIG. 1, in a communication system, a transmitting entity receives an ACK signal 100 indicating that an error does not occur on reception of a first data block DATA 1 from a receiving entity after transmitting the first data block DATA 1 to the receiving entity. The transmitting entity determines that transmission of a second data block DATA 2 has failed if an ACK signal for reception of the second data block DATA 2 is not received from the receiving entity during an inter-frame space (IFS) after transmitting the second data block DATA 2 to the receiving entity, and retransmits the second data block DATA 2.

As described above, a transmitting entity transmits a data block to a receiving entity, and stores the transmitted data block at a buffer until an ACK signal is received from the receiving entity. The transmitting entity deletes the data block stored at the buffer after receiving the ACK signal from the receiving entity.

The receiving entity transfers a data block received from the transmitting entity to an upper layer if no error occurs on the received data block. So, if the transmitting entity increases a size of a data block to be transmitted in order to increase transmission efficiency, data buffering and transmission latency occur in the transmitting entity and the receiving entity.

So, in a communication system, there is a need for a scheme of increasing transmission efficiency without increasing a size of data block to be transmitted in a transmitting entity. Further, in a communication system, there is a need for a scheme of decreasing data buffering and transmission latency occurred in a transmitting entity and a receiving entity.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for transmitting and receiving a signal in a communication system.

Another aspect of the present disclosure is to provide an apparatus and method for transmitting and receiving a control signal related to reception of a data block in a communication system.

Another aspect of the present disclosure is to provide an apparatus and method for transmitting and receiving a control signal related to reception of a data block thereby decreasing data buffering and transmission latency in a communication system.

Another aspect of the present disclosure is to provide non-transitory computer-readable storage medium configured to store one or more computer programs including instructions that when executed by at least one processor, cause the at least one processor to transmit a data frame including one preamble and a plurality of data blocks to another terminal, detect a preset signal from a signal received through an antenna while the data frame is transmitted, and stop the transmitting of the data frame and transmitting at least one data block where an error occurs and which is recognized based on the received preset signal.

Another aspect of the present disclosure is to provide a non-transitory computer-readable storage medium configured to store one or more computer programs including instructions that, when executed by at least one processor cause the at least one processor to receive one preamble and a plurality of data blocks included in a data frame received from another terminal, transmit a preset signal if retransmission for at least one data block among the received data blocks is requested, receive the at least one data block for which the retransmission is requested in response to the transmitted preset signal, and resume receiving a data block for which reception is stopped according to the retransmission request among the plurality of data blocks included in the data frame. In accordance with an aspect of the present disclosure, a terminal in a communication system is provided. The terminal includes a transmitter configured to transmit a data frame including one preamble and a plurality of data blocks to another terminal by considering whether a preset signal is received, and a receiver configured to detect the preset signal from a signal received through an antenna while the data frame is transmitted by the transmitter.

In accordance with another aspect of the present disclosure, a method for transmitting and receiving a signal in a terminal in a communication system is provided. The method includes transmitting a data frame including one preamble and a plurality of data blocks to another terminal, detecting a preset signal from a signal received through an antenna while the data frame is transmitted, and stopping the transmitting of the data frame and transmitting at least one data block where an error occurs and which is recognized based on the received preset signal.

In accordance with another aspect of the present disclosure, a terminal in a communication system is provided. The terminal includes a transmitter configured to transmit a preset signal to another terminal if retransmission for at least one data block, among one preamble and a plurality of data blocks included in a data frame received from the other terminal, is requested, and a receiver configured to receive the one preamble and the plurality of data blocks included in the data frame received from the other terminal, receive the at least one data block for which the retransmission is requested in response to the transmitted preset signal, and resume receiving a data block for which reception is stopped according to the retransmission request among the plurality of data blocks included in the data frame.

In accordance with another aspect of the present disclosure, a method for transmitting and receiving a signal in a terminal in a communication system is provided. The method includes receiving one preamble and a plurality of data blocks included in a data frame received from another terminal, transmitting a preset signal if retransmission for at least one data block among the received data blocks is requested, receiving the at least one data block for which the retransmission is requested in response to the transmitted preset signal, and resuming receiving a data block for which reception is stopped according to the retransmission request among the plurality of data blocks included in the data frame.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
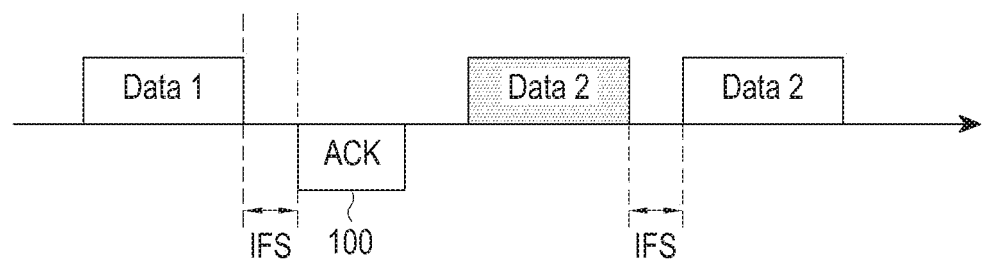
FIG. 1 schematically illustrates an example of a method of transmitting and receiving a signal using a positive acknowledgement (positive ACK) protocol in a general communication system according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

It will be further understood that the terms "comprises" and/or "has," when used in this specification, specify the presence of a stated feature, number, operation, component, element, or combination thereof, but do not preclude the presence or addition of one or more other features, numbers, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), a Moving Picture Experts Group phase 1 or phase 2 (MPEG-1 or MPEG-2) audio layer 3 (mp3) player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television (TV), a digital versatile disc (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, each of a transmitting apparatus and a receiving apparatus may be an electronic device.

According to various embodiments of the present disclosure, a transmitting apparatus may be a base station (BS) or a terminal.

According to various embodiments of the present disclosure, a receiving apparatus may be a wireless communication terminal or a BS.

According to various embodiments of the present disclosure, a transmitting/receiving apparatus may be a wireless communication terminal or a BS.

In various embodiments of the present disclosure, a transmitting apparatus may be referred to as transmitting entity and a receiving apparatus may be referred to as receiving entity.

In various embodiments of the present disclosure, it will be noted that the term wireless communication terminal may be interchangeable with the term mobile station (MS), wireless terminal, mobile device, user equipment (UE), and/or the like.

In various embodiments of the present disclosure, it will be noted that the term BS may be interchangeable with the term enhanced node B (eNB), access point (AP), and/or the like.

In an embodiment of the present disclosure, a transmitting/receiving apparatus included in a communication system transmits a data frame including one preamble and a plurality of data blocks to an opponent wireless communication terminal by considering whether a control signal is received, and detects the control signal from a signal received through an antenna while a transmitter transmits the data frame.

For this, an apparatus and method for transmitting and receiving a signal in a communication system according to an embodiment of the present disclosure will be described below. An apparatus and method for transmitting and receiving a signal according to an embodiment of the present disclosure may be applied to all communication systems. For example, an apparatus and method for transmitting and receiving a signal according to an embodiment of the present disclosure may be effectively applied to a communication system which needs to perform communication with a high speed, e.g., a wireless communication system which supports near-field communication.

In a communication system according to an embodiment of the present disclosure, it will be assumed that an apparatus for transmitting and receiving a signal is a wireless communication terminal.

An embodiment of the present disclosure proposes an apparatus and method for transmitting and receiving a signal in a communication system.

An embodiment of the present disclosure proposes an apparatus and method for transmitting and receiving a control signal related to reception of a data block in a communication system.

An embodiment of the present disclosure proposes an apparatus and method for transmitting and receiving a control signal related to reception of a data block thereby decreasing data buffering and transmission latency in a communication system.

An apparatus and method proposed in an embodiment of the present disclosure may be applied to various communication systems such as a digital video broadcasting system such as a mobile broadcasting service such as a digital multimedia broadcasting (DMB) service, a digital video broadcasting-handheld (DVP-H) service, an advanced television systems committee-mobile/handheld (ATSC-M/H) service, and the like, and an internet protocol TV (IPTV) service, an MPEG media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a 3rd generation partnership project 2 (3GPP2), a wideband code division multiple access (WCDMA) mobile communication system proposed in the 3GPP2, a CDMA mobile communication system proposed in the 3GPP2, an institute of electrical and electronics engineers (IEEE) mobile communication system, a mobile IP system, and/or the like.

A process of transmitting and receiving a signal in a communication system according to an embodiment of the present disclosure will be described with reference to FIG. 2.

Figure 2:
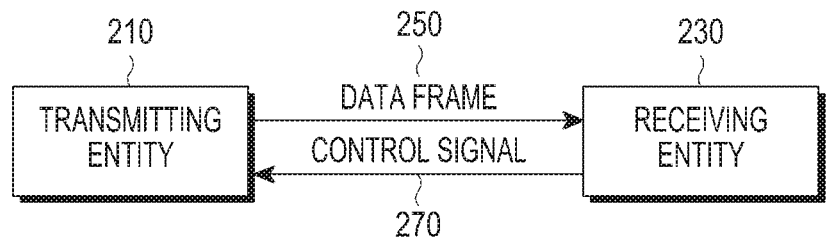
FIG. 2 schematically illustrates a process of transmitting and receiving a signal in a communication system according to an embodiment of the present disclosure.

FIG. 2 schematically illustrates a process of transmitting and receiving a signal in a communication system according to an embodiment of the present disclosure. Here, a communication system according to an embodiment of the present disclosure uses a negative acknowledgement (negative ACK) protocol in order to check transmission and reception of a data block.

Referring to FIG. 2, a transmitting entity 210 continuously transmits a preamble signal and a plurality of data blocks, e.g., Data0 to DataN to a receiving entity 230 when transmitting a data frame at operation 250. The receiving entity 230 detects whether an error occurs on reception of a data block transmitted from the transmitting entity 210, and transmits a control signal indicating an ACK to the transmitting entity 210 upon detecting that the error occurs at operation 270. Here, the control signal includes a signal with a specific period, and the signal with the specific period may be, for example, a Bark signal.

The transmitting entity 210 may not know when a Bark signal will be transmitted, so the transmitting entity 210 continuously transmits data blocks included in a data frame to the receiving entity 230. The transmitting entity 210 receives a Bark signal for a data block transmitted before the data blocks from the receiving entity 230 while transmitting the data blocks. Upon detecting the Bark signal transmitted from the receiving entity 230, the transmitting entity 210 determines that an error occurs on reception of the previously transmitted data block. So, the transmitting entity 210 retransmits the previously transmitted data block. A method of detecting a Bark signal in the transmitting entity 210 will be described with reference to FIGS. 3 to 8, so a detailed description thereof will be omitted herein. The Bark signal includes a specific signal which is transmitted from the receiving entity 230 to the transmitting entity 210 through an in-band. The Bark signal does not include a preamble signal for bit synchronization and includes a signature or a sequence with a simple period, not a data frame.

Each of the transmitting entity 210 and the receiving entity 230 may include a transceiver for transmitting and receiving a signal according to an embodiment of the present disclosure, and this will be described with reference to FIG. 3.

Figure 3:
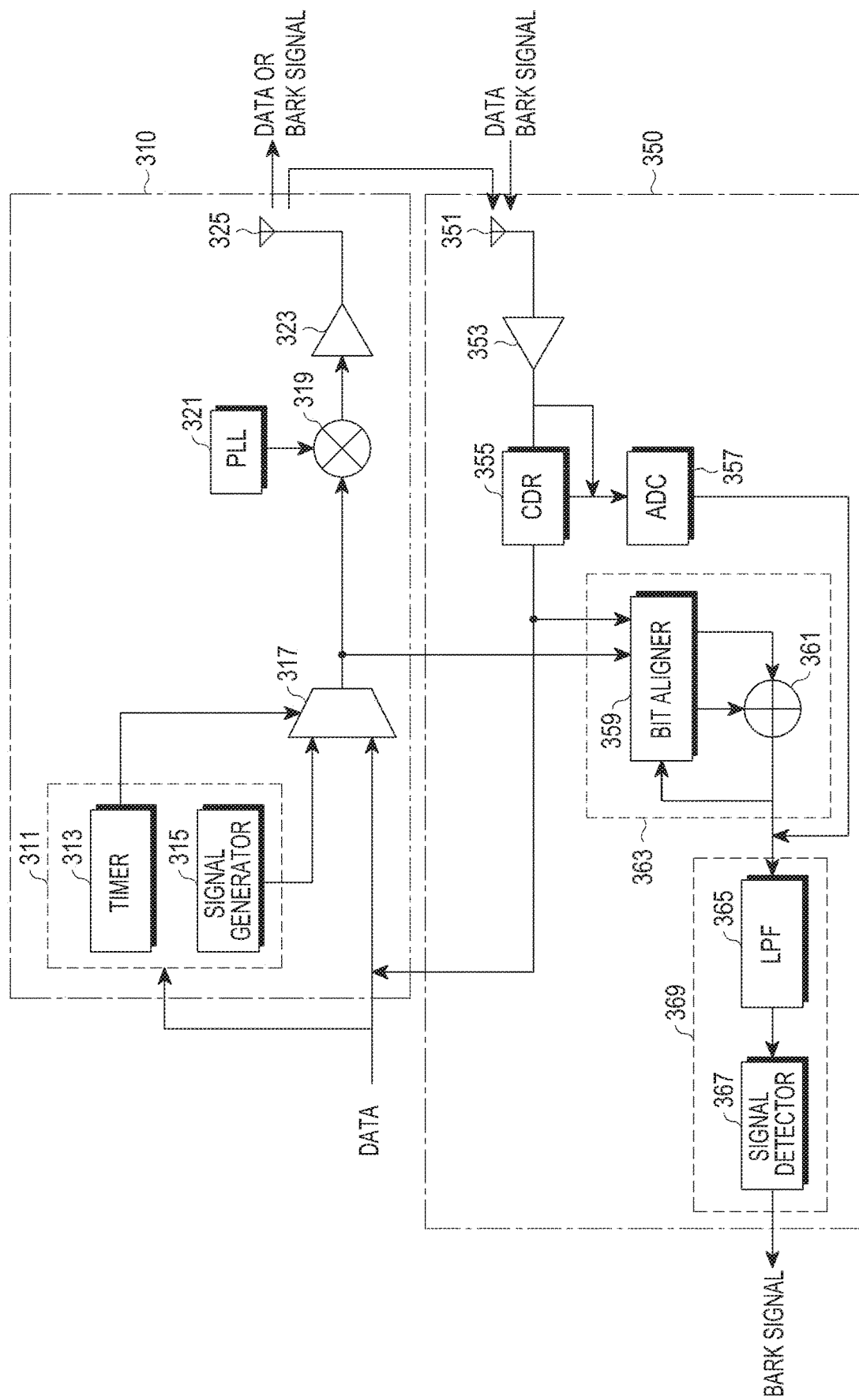
FIG. 3 schematically illustrates a transceiver included in each of a transmitting entity and a receiving entity in a communication system according to an embodiment of the present disclosure.

FIG. 3 schematically illustrates a transceiver included in each of a transmitting entity and a receiving entity in a communication system according to an embodiment of the present disclosure.

Referring to FIG. 3, each of the transmitting entity and the receiving entity may be a wireless communication terminal.

Further, the transceiver includes a transmitter 310 which transmits a data block or a Bark signal, and a receiver 350 which receives at least one of a data block and a Bark signal through an antenna to detect the Bark signal.

If the transceiver is included in a transmitting entity 210 as described in FIG. 2, the transmitter 310 transmits a data block, and the receiver 350 receives a data block and a Bark signal to detect the Bark signal. If the transceiver is included in a receiving entity 230 as described in FIG. 2, the receiver 350 receives data, and the transmitter 310 may transmit a Bark signal according to whether an error occurs on the received data block.

The transmitter 310 includes a signal generator 311, a multiplexer 317, a phase locked loop (PLL) 321, a multiplier 319, a low noise amplifier (LNA) 323, and a transmission antenna 325. The signal generator 311 and the multiplexer 317 may be configured with one processor, and at least two of the PLL 321, the multiplier 319, the LNA 323, and the transmission antenna 325 may be configured with one processor.

The signal generator 311 and the multiplexer 317 included in the transmitter 310 output at least one of a Bark signal and a data block. The signal generator 311 includes a timer 313 and a signal generator 315. The timer 313 predicts a time at which the receiver 350 will receive data and determines the predicted time as a time at which the receiver 350 will transmit a Bark signal. For example, the timer 313 may determine transmission time for a Bark signal such that the Bark signal is not transmitted in an interval where a preamble signal and a data block are changed and the Bark signal is transmitted in an interval where one data block is transmitted. The timer 313 inputs a control signal for controlling an output of a Bark signal to the multiplexer 317 in order that the Bark signal will be transmitted at the determined time.

The signal generator 315 determines whether an error occurs on reception of a data block, and generates a Bark signal if the error occurs. The signal generator 315 may generate another signal according to a structure of the receiver 350. For example, if the receiver 350 is configured such that the receiver 350 may detect a Bark signal based on a digital scheme, the signal generator 315 may generate the Bark signal as a sequence signal or a low-frequency periodic signal. For another example, if the receiver 350 is configured such that the receiver 350 may detect a Bark signal based on an analog scheme, the signal generator 315 may generate the Bark signal as a periodic signal from which an interference signal may be measured.

The multiplexer 317 transfers one of a data block and a Bark signal to a multiplier 319 according to the control signal input from the timer 313.

The PLL 321, the multiplier 319, the LNA 323, and the transmission antenna 325 transmit the signal transferred from the multiplexer 317 to the receiving entity 230. The multiplier 319 multiplies the frequency signal transferred from the PLL 321 and the signal transferred from the multiplexer 317 to transfer the multiplied signal to the LNA 323. The LNA 323 amplifies the signal transferred from the multiplier 319 corresponding to a preset gain to transmit the amplified signal to the receiving entity 230 through the transmission antenna 325.

In FIG. 3, the receiver 350 includes a reception antenna 351, an LNA 353, a clock and data recovery (CDR) unit 355, an analog to digital converter (ADC) 357, a digital canceller 363, and a signal detecting unit 369. The receiver 350 may include at least one of the ADC 357 and the digital canceller 363 according to an embodiment of the present disclosure. The digital canceller 363 includes a bit aligner 359 and an adder 361, and the signal detecting unit 369 includes a low pass filter (LPF) 365 and a signal detector 367. The reception antenna 351 and the LNA 353 may be configured with one processor, and at least two of the CDR 355, the ADC 357, the digital canceller 363, and the signal detecting unit 369 may be configured with one processor.

The reception antenna 351 and the LNA 353 receive at least one of a Bark signal and a data block. The Bark signal may be received from an opponent entity, and the data may be received from an opponent entity or be inputted from an inner transmitter 310.

The LNA 353 transfers at least one of the Bark signal and the data received through the reception antenna 351 to the CDR 355.

The CDR 355, the ADC 357, the digital canceller 363, and the signal detecting unit 369 detect the Bark signal by cancelling the signal output from the multiplexer 317 included in the transmitter 310 from the signal transferred from the LNA 353. The CDR 355 synchronizes a bit included in the signal transferred from the LNA 353. The Bark signal is a low-frequency signal, so the CDR 355 may perform bit synchronization on transmitted data. For example, upon receiving a Bark signal from an opponent entity, the receiver 350 according to an embodiment of the present disclosure may receive data from the transmitter 310 along with the Bark signal. That is, the Bark signal and the data block may be input to the CDR 355 at the same time. If the Bark signal includes a preamble, the Bark signal interferes with data. So, the receiver 350 may not normally receive a signal if the Bark signal includes a preamble for bit synchronization.

So, an embodiment of the present disclosure uses a Bark signal as a low-frequency signal which does not include a preamble. Therefore, the CDR 355 performs bit synchronization on a preamble and data included in a data frame and does not perform bit synchronization on a Bark signal. The CDR 355 may output a signal to a bit canceller 363 or an ADC 357. Here, a process of outputting the signal from the CDR 355 to the ADC 357 will be described with reference to FIGS. 4 and 5, and a detailed description thereof will be omitted herein.

The bit aligner 359 receives a data block from the multiplexer 317 included in the transmitter 310 and receives a signal from the CDR 355. Delay may occur on the signal received from the CDR 355, so the bit aligner 359 corrects a bit position between data input from the multiplexer 317 (hereinafter, "first signal") and a signal transferred from the CDR 355 (hereinafter, "second signal") using a feedback loop. The bit aligner 359 transfers the first signal and the second signal of which bits are adjusted to the adder 361. The adder 361 subtracts the first signal and the second signal transferred from the bit aligner 359 from each other to transfer the subtracted signal to the LPF 365. If the receiver 350 receives a Bark signal from an opponent entity, the subtracted signal may be a Bark signal.

The CDR 355 does not perform bit synchronization on a Bark signal, so a glitch may occur on the subtracted signal (i.e., a Bark signal) transferred from the adder 361. Further, the Bark signal may include a noise according to a radio environment at which an opponent entity transmits the Bark signal to the receiver 350. So, in an embodiment of the present disclosure, the LPF 365 is used for canceling the glitch and the noise included in the Bark signal. That is, the LPF 365 filters a low-frequency signal from the subtracted signal transferred from the adder 361 to transfer the filtered signal to the signal detector 367. The signal detector 367 detects a periodic signal which corresponds to the Bark signal according to the transferred signal. The signal detector 367 is configured with a correlator, and may detect a periodic signal which corresponds to the Bark signal.

Meanwhile, if the transmitting entity 210 performs detection of a Bark signal based on an on/off signal, the transmitting entity 210 may detect the Bark signal from a received signal strength indication (RSSI) or an interference signal output from a voltage controlled oscillator (VCO) included in the CDR 355.

A process of detecting a Bark signal from an interference signal output from the CDR 355 will be described with reference to FIGS. 4 and 5.

An example of an inner structure of a CDR included in a receiver included in a transceiver in a communication system according to an embodiment of the present disclosure will be described with reference to FIG. 4.

Figure 4:
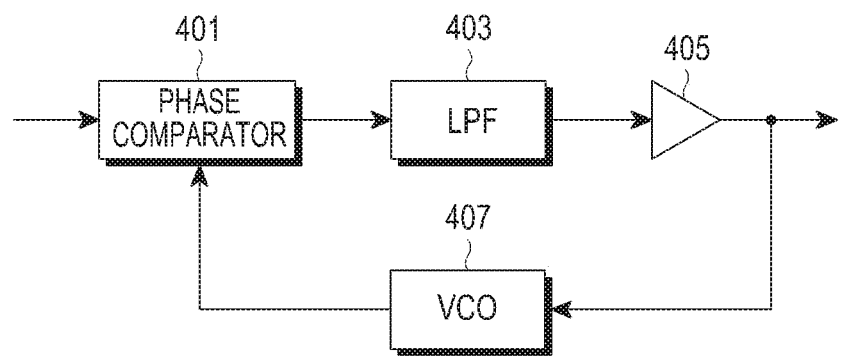
FIG. 4 schematically illustrates an example of an inner structure of a clock and data recovery (CDR) unit included in a receiver included in a transceiver in a communication system according to an embodiment of the present disclosure.

FIG. 4 schematically illustrates an example of an inner structure of a CDR included in a receiver included in a transceiver in a communication system according to an embodiment of the present disclosure.

Referring to FIG. 4, a CDR 355 includes a PLL. The PLL includes a phase comparator 401, an LPF 403, an amplifier 405, and a VCO 407.

The phase comparator 401 compares a frequency and a phase of an input signal to an oscillation frequency and a phase transferred from the VCO 407 to generate DC voltage which is proportional to an error thereof. The LPF 403 filters the generated voltage and outputs the filtered signal to the amplifier 405. The amplifier 405 amplifies the signal output from the LPF 403 corresponding to a preset gain to output the amplified signal. That is, the PLL is a circuit for matching a frequency of an input signal and a frequency transferred from the VCO 407, and the frequency of the input signal is proportional to an input voltage of the VCO 407.

When the transmitting entity 210 receives a Bark signal with a frequency of fc_bark which is different from a carrier frequency while normally transmitting data to the receiving entity 230, a spectrum that may be varied like that an interference signal is included in an input frequency, and this will be described with reference to FIG. 5.

Figure 5:
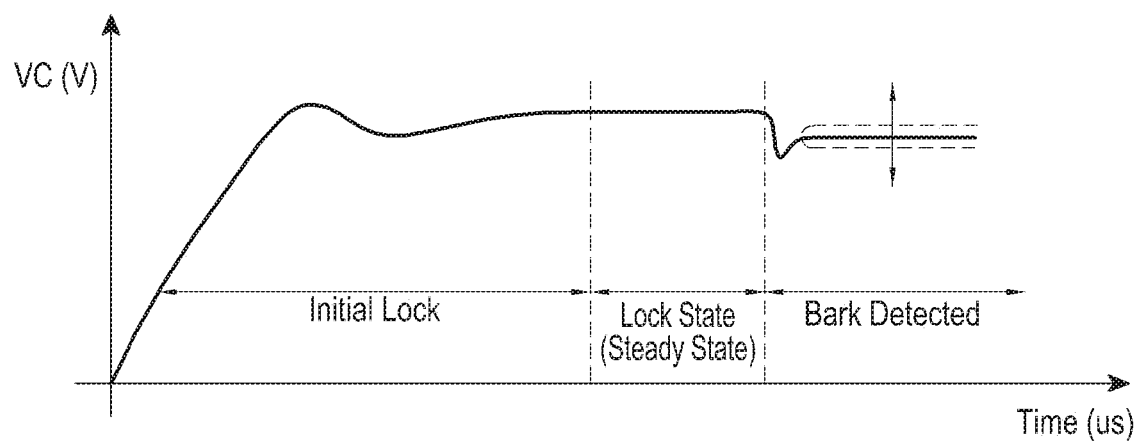
FIG. 5 schematically illustrates an example of a spectrum change in a case that a transmitting entity receives a Bark signal in a communication system according to an embodiment of the present disclosure.

FIG. 5 schematically illustrates an example of a spectrum change in a case that a transmitting entity receives a Bark signal in a communication system according to an embodiment of the present disclosure.

Referring to FIG. 5, if a transmitting entity, e.g., a transmitting entity 210 as described in FIG. 2 receives a Bark signal with a frequency of fc_bark that is different from a carrier frequency while normally transmitting data to a receiving entity, e.g., a receiving entity 230 as described in FIG. 2, a spectrum is changed such that an interference signal is included in an input frequency.

The frequency of fc_bark may be defined as Equation 1.

$$fc\_bark\text{-}fcarrier > Kvco * LSB_{ADC} \qquad \text{Equation 1}$$

In Equation 1, fc_bark indicates a center frequency of a Bark signal, fcarrier indicates center frequency of a normal radio signal, Kvco indicates a VCO voltage gain, and $LSB_{ADC}$ indicates a voltage amplitude for a minimum bit of an ADC.

An example of a spectrum change in FIG. 5 indicates an example of a change of input voltage of a VCO 407 according to an operation of a CDR 355 and an example of a voltage change according to transmission of a Bark signal. A signal which corresponds to this voltage change, i.e., frequency spectrum change is input to the ADC 357 and converted to a digital signal in the ADC 357. The signal detecting unit 369 may detect a Bark signal from the signal acquired according to the conversion.

An example of a spectrum change in a case that a transmitting entity receives a Bark signal in a communication system according to an embodiment of the present disclosure has been described with reference to FIG. 5, and an example of a signal output from each unit included in a transceiver in a communication system according to an embodiment of the present disclosure will be described with reference to FIG. 6.

Figure 6:
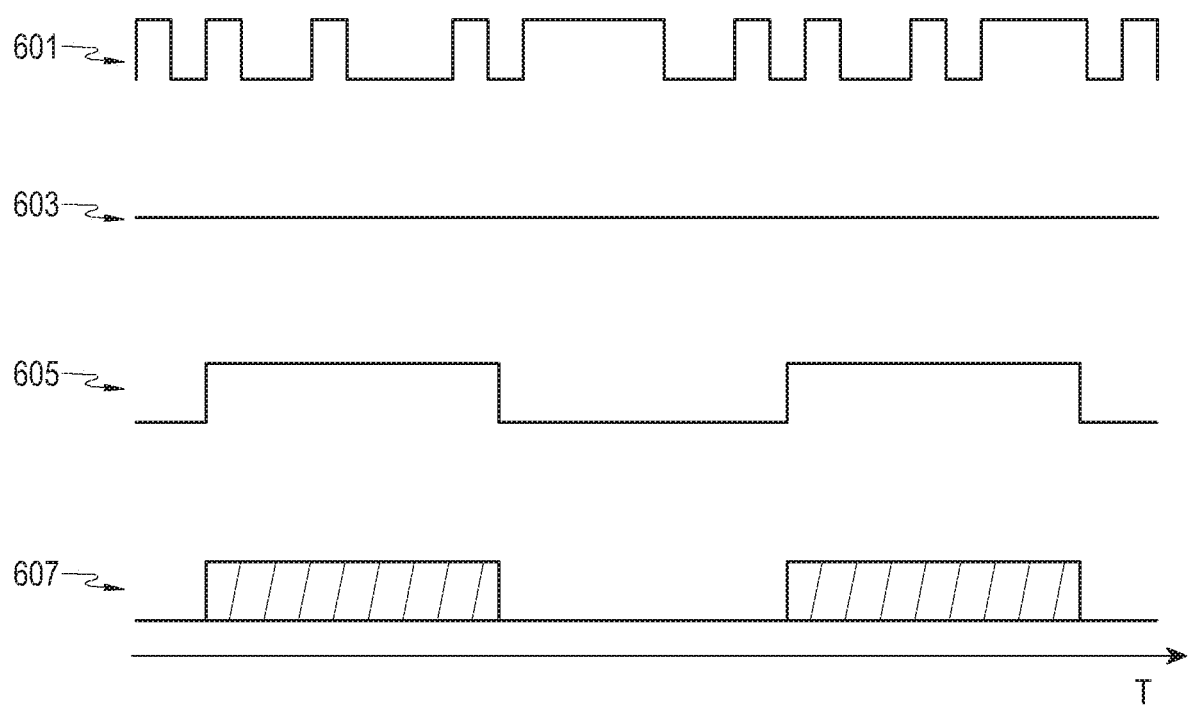
FIG. 6 schematically illustrates an example of a signal output from each unit included in a transceiver in a communication system according to an embodiment of the present disclosure.

FIG. 6 schematically illustrates an example of a signal output from each unit included in a transceiver in a communication system according to an embodiment of the present disclosure.

Referring to FIG. 6, it will be assumed that 601 indicates a signal including a data block, and 605 indicates a Bark signal. If a Bark signal is not transmitted to a receiver 350 included in a transmitting entity 210, a digital canceller 363 receives a signal 601 from a multiplexer 317, and may output a signal 603 by subtracting a signal 601 received from a reception antenna 351 from the signal 601.

If the signal 605 is transmitted to the receiver 350 included in the transmitting entity 210, the reception antenna 351 receives a signal 601 and a signal 605 at the same time. In this case, the digital canceller 363 may output a signal 607 by subtracting the signal 601 transferred from the multiplexer 317 from a signal in which the signal 601 and the signal 605 received in the reception antenna 351 at the same time are added.

An example of a signal output from each unit included in a transceiver in a communication system according to an embodiment of the present disclosure has been described with reference to FIG. 6, and a process of transmitting and receiving a signal in a transmitting entity in a communication system according to an embodiment of the present disclosure will be described with reference to FIG. 7.

Figure 7:
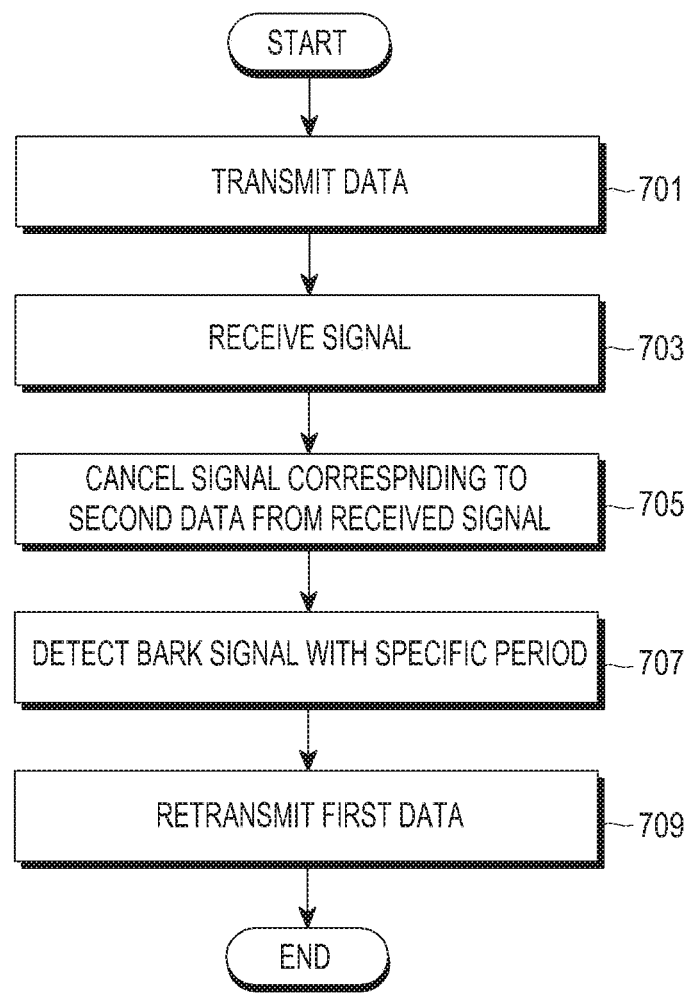
FIG. 7 schematically illustrates a process of transmitting and receiving a signal in a transmitting entity in a communication system according to an embodiment of the present disclosure.

FIG. 7 schematically illustrates a process of transmitting and receiving a signal in a transmitting entity in a communication system according to an embodiment of the present disclosure.

Referring to FIG. 7, a transmitter 310 included in a transmitting entity 210 continuously transmits data blocks included in one data frame at operation 701. For example, it will be assumed that the transmitting entity 210 transmits the second data block after transmitting the first data block.

A receiver 350 included in the transmitting entity 210 receives a signal through an antenna at operation 703. The receiver 350 receives the second data block from the transmitter 310 through the antenna and receives a Bark signal for reception of a signal transmitted before the second data block, e.g., reception of the first data block from a receiving entity 230 at the same time.

The receiver 350 cancels the second data block from the received signal at operation 705. From this, the receiver 350 may detect a Bark signal with a specific period from the received signal at operation 707. So, a transmitter 310 included in the transmitting entity 210 retransmits the first data block transmitted before the second data block at operation 709.

A process of transmitting and receiving a signal in a transmitting entity in a communication system according to an embodiment of the present disclosure has been described with reference to FIG. 7, and a process of transmitting and receiving a signal in a receiving entity in a communication system according to an embodiment of the present disclosure will be described with reference to FIG. 8.

Figure 8:
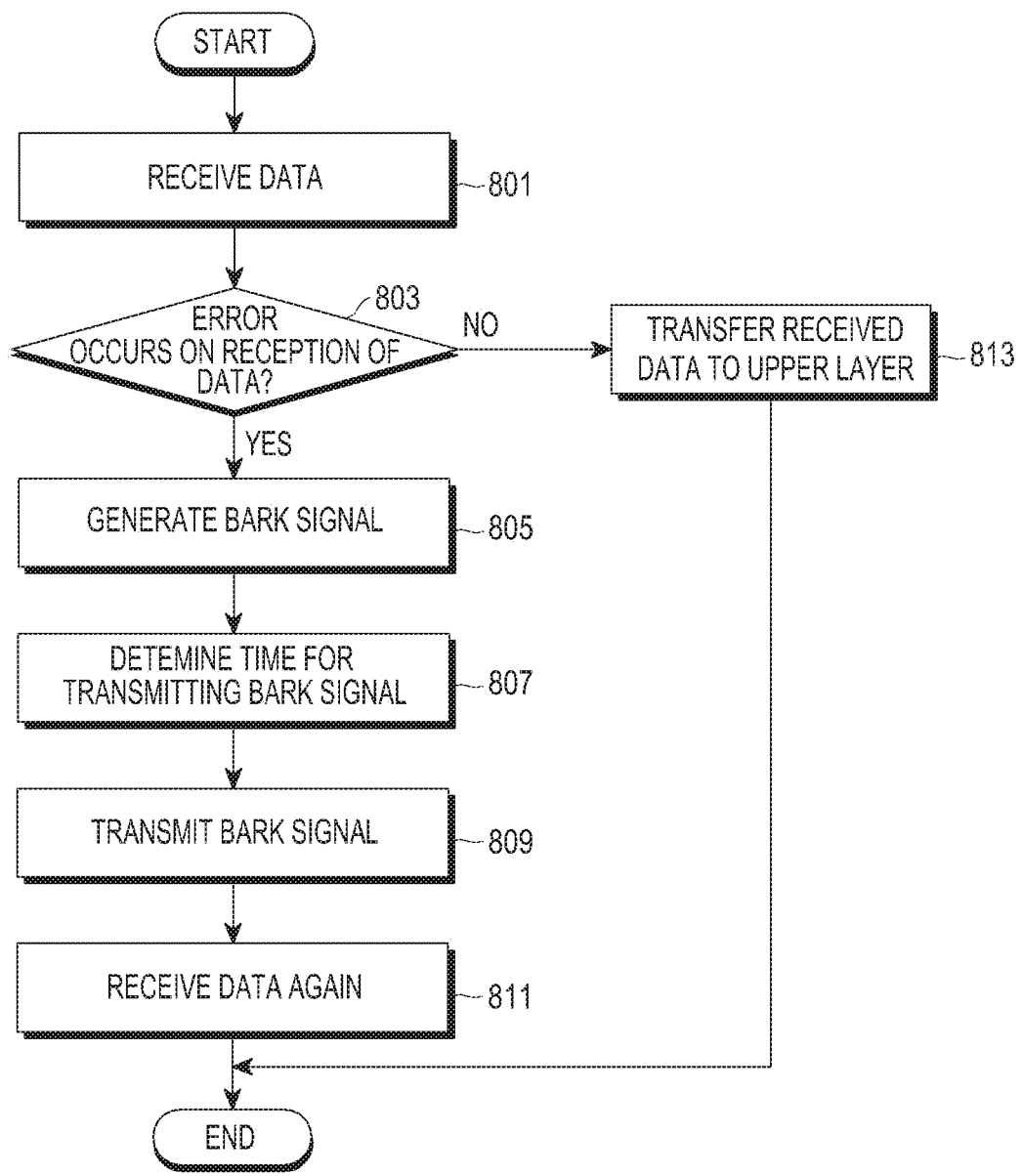
FIG. 8 schematically illustrates a process of transmitting and receiving a signal in a receiving entity in a communication system according to an embodiment of the present disclosure.

FIG. 8 schematically illustrates a process of transmitting and receiving a signal in a receiving entity in a communication system according to an embodiment of the present disclosure.

Referring to FIG. 8, a receiver 350 included in a receiving entity 230 receives a data block from a transmitting entity 210 at operation 801. A transmitter 310 included in the receiving entity 230 determines whether an error occurs on reception of the data block at operation 803. If the error does not occur on the reception of the data block, the transmitter 310 transfers the received data block to an upper layer at operation 813. If the error occurs on the reception of the data block, the transmitter 310 generates a Bark signal at operation 805. The Bark has a specific period at a low-frequency band, and does not include a preamble.

The transmitter 310 determines a time at which the Bark signal will be transmitted such that the Bark signal will be output at a time identical to a time at which the next data block will be output in the transmitting entity 210 at operation 807. The transmitter 310 transmits the generated Bark signal to the transmitting entity 210 at the determined time at operation 809. The receiver 350 receives a data block which is not normally received from the transmitting entity 210 again at operation 811.

A process of transmitting and receiving a signal in a receiving entity in a communication system according to an embodiment of the present disclosure has been described with reference to FIG. 8, and an example of a process of transmitting and receiving a signal in a transmitting entity and a receiving entity in a communication system according to an embodiment of the present disclosure will be described with reference to FIG. 9.

Figure 9:
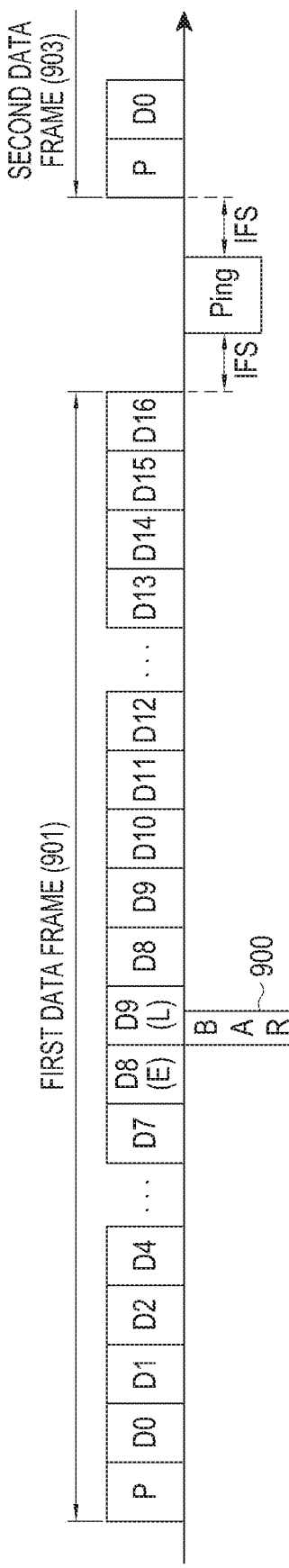
FIG. 9 schematically illustrates an example of a process of transmitting and receiving a signal in a transmitting entity and a receiving entity in a communication system according to an embodiment of the present disclosure.

FIG. 9 schematically illustrates an example of a process of transmitting and receiving a signal in a transmitting entity and a receiving entity in a communication system according to an embodiment of the present disclosure.

Referring to FIG. 9, a transmitting entity, e.g., a transmitting entity 210 continuously transmits a preamble signal P and a plurality of data blocks D0 to D16 included in the first data frame 901. The transmitting entity 210 transmits the second data frame 903 by considering an IFS and a Ping interval. At this time, in a case that the transmitting entity 210 transmits the eighth data block D8, and an error occurs on reception of the eighth data block D8 in a receiving entity, e.g., a receiving entity 230, the transmitting entity 210 may receive a Bark signal 900 from the receiving entity 230 at time which the ninth data block D9 is transmitted. The transmitting entity 210 may detect a Bark signal by cancelling the ninth data block D9 from a signal in which the ninth data block D9 and the Bark signal are combined. So, the transmitting entity 210 detects that an error has occurred on the reception of the eighth data block D8 transmitted before the ninth data block D9, and may retransmit the eighth data block D8 to the receiving entity 230.

An example of a process of transmitting and receiving a signal in a transmitting entity and a receiving entity in a communication system according to an embodiment of the present disclosure has been described with reference to FIG. 9, and inputs and outputs of buffers managed by a transmitting entity and a receiving entity in a communication system according to an embodiment of the present disclosure will be described with reference to FIG. 10.

Figure 10:
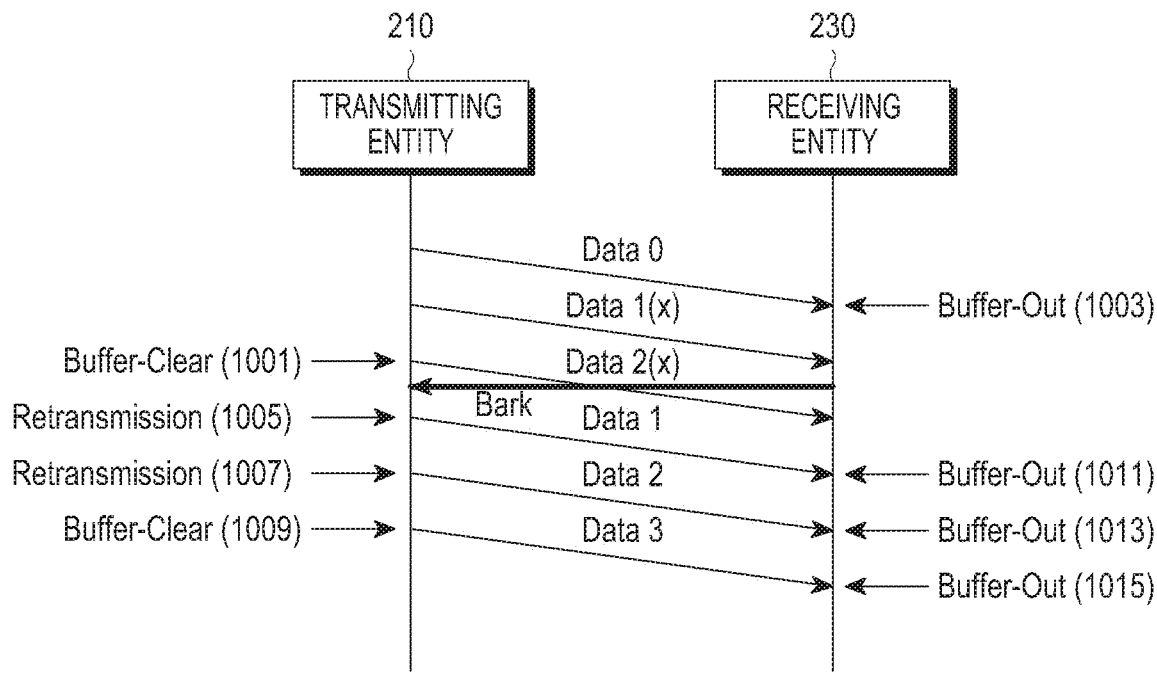
FIG. 10 schematically illustrates inputs and outputs of buffers managed by a transmitting entity and a receiving entity in a communication system according to an embodiment of the present disclosure.

FIG. 10 schematically illustrates inputs and outputs of buffers managed by a transmitting entity and a receiving entity in a communication system according to an embodiment of the present disclosure.

Referring to FIG. 10, if a Bark signal is not received after a transmitting entity, e.g., a transmitting entity 210 transmits the first data block Data 0 and the second data block Data1 to a receiving entity, e.g., a receiving entity 230, the transmitting entity 210 deletes the first data block Data 0 (Buffer-Clear). If an error does not occur on reception of the first data block Data 0, the receiving entity 230 transfers the first data block Data 0 to an upper layer without storing the first data block Data 0 at a buffer (Buffer-Out).

If the transmitting entity 210 receives a Bark signal while transmitting the third data block Data 2, the transmitting entity 210 determines that an error occurs on reception of the second data block Data 1. So, the transmitting entity 210 retransmits the second data block Data 1 and the third data block Data 2 at operations 1005 and 1007, and deletes the second data block Data 1 from the buffer if a Bark signal is not received at time at which the fourth data block Data 3 is transmitted at operation 1009. Similarly, the transmitting entity 210 deletes a previously transmitted data block from the buffer if a corresponding Bark signal is not received at operation 1001. The receiving entity 230 transfers a corresponding data block to the upper layer whenever the receiving entity 230 determines that an error does not occur on reception of each of the second data block Data 1 to the fourth data block Data 3 at operations 1011 to 1015. Similarly, the receiving entity 230 may previously transfer a corresponding data block to the upper layer at operation 1003.

In a communication system according to an embodiment of the present disclosure, a transmitting entity 210 and a receiving entity 230 receive a Bark signal while transmitting a data block, so the transmitting entity 210 and the receiving entity 230 may maintain a relatively high transmission efficiency even though a relatively small data size is used, and may decrease transmission latency and be implemented with low power since unnecessary data is not stored at a buffer.

Inputs and outputs of buffers managed by a transmitting entity and a receiving entity in a communication system according to an embodiment of the present disclosure has been described with reference to FIG. 10, and a transmission efficiency according to a signal transmitting/receiving scheme of the related art and a transmission efficiency according to a signal transmitting/receiving scheme according to an embodiment of the present disclosure will be described with reference to FIG. 11.

Figure 11:
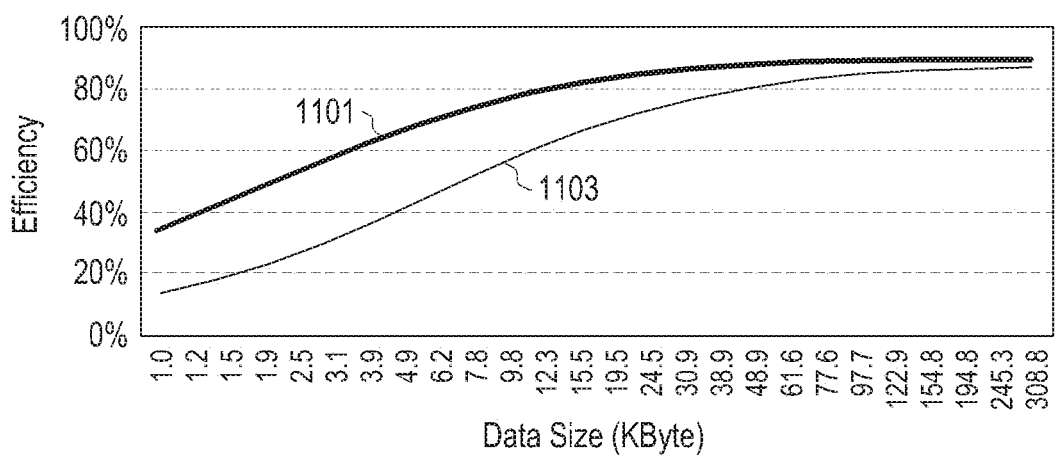
FIG. 11 schematically illustrates a transmission efficiency according to a signal transmitting/receiving scheme of the related art and a transmission efficiency according to a signal transmitting/receiving scheme according to an embodiment of the present disclosure.

FIG. 11 schematically illustrates a transmission efficiency according to a signal transmitting/receiving scheme of the related art and a transmission efficiency according to a signal transmitting/receiving scheme according to an embodiment of the present disclosure.

Referring to FIG. 11, a graph 1101 indicates a transmission efficiency in a case that a signal transmitting/receiving scheme according to an embodiment of the present disclosure is applied, and a graph 1103 indicates a transmission efficiency in a case that a signal transmitting/receiving scheme of the related art is applied.

As shown in FIG. 11, it will be understood that in the graph 1101 indicating the transmission efficiency in the case that the signal transmitting/receiving scheme according to an embodiment of the present disclosure is applied, a high transmission efficiency is acquired even though a data size is relatively small compared to the graph 1103 indicating the transmission efficiency in the case that the signal transmitting/receiving scheme of the related art is applied.

According to this transmission efficiency, a Bark signal according to an embodiment of the present disclosure may be used for a multi station to request transmission. Generally, a carrier sensing scheme is used when N terminals communicate with one another. However, if one terminal occupies one air channel, another terminal may not request transmission. However, in an embodiment of the present disclosure, in a case that one terminal transmits a Bark signal including an identifier (ID) of the one terminal while the other terminal transmits a data block, terminals detecting the Bark signal may stop a transmission operation and transfer a transmission opportunity (TXOP) to a terminal which requests transmission. For example, when an internet of things (IoT) device intends to transmit data periodically, the IoT device may transmit the data using a signal with the highest priority regardless of whether an air channel is used. This method is efficient for simplifying a structure of the IoT device and decreasing consumption power.

As is apparent from the foregoing description, an embodiment of the present disclosure enables transmission and reception of a control signal related to reception of a data block in a communication system.

An embodiment of the present disclosure enables transmission and reception of a control signal related to reception of a data block thereby decreasing data buffering and transmission latency in a communication system.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), compact disc ROMs (CD-ROMs), magnetic tapes, floppy disks, optical data storage devices, and carrier waves (such as data transmission through the internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a CD, a DVD, a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protection method which has been already installed, information necessary for the content protection method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A terminal in a communication system, the terminal comprising:
    a transmitter configured to:
        transmit a preamble and one or more data blocks until detecting that a preset signal for negative acknowledgement of one of the one or more data blocks is received from a receiving entity; and
    a receiver configured to perform a bit synchronization operation on a digital transmission signal including a data block among the one or more data blocks and a signal received through an antenna and to decide whether detecting the preset signal based on the bit synchronized digital transmission signal and the bit synchronized received signal, while the one or more data blocks are being transmitted by the transmitter.

2. The terminal of claim 1, wherein the receiver is configured to detect the preset signal based on a frequency spectrum change of the received signal.

3. The terminal of claim 2, wherein the receiver comprises:
    a voltage controlled oscillator (VCO) configured to control a voltage level for changing a carrier frequency corresponding to the frequency spectrum change of the received signal;
    an analog to digital converter configured to convert the voltage level controlled by the VCO to a digital signal; and
    a detector configured to detect the preset signal based on the digital signal output by the analog to digital converter.

4. The terminal of claim 3, wherein the detector comprises a low pass filter (LPF) configured to cancel at least one of a glitch or a noise from the digital signal output by the analog to digital converter.

5. The terminal of claim 1, wherein the receiver is further configured to:
    subtract the bit synchronized digital transmission signal from the bit synchronized received.

6. The terminal of claim 5, wherein the receiver comprises:
    a digital canceller configured to:
        convert the received signal to a digital received signal,
        perform a bit synchronization operation on the converted digital received signal by using the digital transmission signal generated in the transmitter, and
        subtract the bit synchronized digital transmission signal from the bit synchronized received signal; and
    a detector configured to detect the preset signal based on an output signal of the digital canceller.

7. The terminal of claim 6, wherein the detector comprises a low pass filter (LPF) configured to cancel at least one of a glitch or a noise from the output signal of the digital canceller.

8. The terminal of claim 1, wherein the transmitter is further configured to:
    stop transmitting the one or more data blocks in response to detecting the preset signal while transmitting the one or more data blocks,
    retransmit at least one data block corresponding to the detected preset signal, and
    resume transmitting the succeeding data blocks.

9. A method for transmitting data in a terminal in a communication system, the method comprising:
    transmitting a preamble and one or more data blocks until detecting that a preset signal for negative acknowledgement of one of the one or more data blocks is received from the receiving entity;
    performing a bit synchronization operation on a digital transmission signal including a data block among the one or more data blocks and a signal received through an antenna;
    deciding whether detecting the preset signal based on the bit synchronized digital transmission signal the bit synchronized received signal, while the one or more data blocks are being transmitted; and
    stopping transmitting the one or more data blocks in response to detecting the preset signal while transmitting the one or more data blocks.

10. The method of claim 9, wherein the detecting of the preset signal comprises detecting the preset signal based on a frequency spectrum change of the received signal.

11. The method of claim 9, wherein the detecting of the preset signal comprises:
    controlling a voltage level for changing a carrier frequency corresponding to the frequency spectrum change of the received signal;
    converting the controlled voltage level to a digital signal; and
    detecting the preset signal based on the converted digital signal.

12. The method of claim 11, wherein the detecting of the preset signal further comprises:
    cancelling at least one of a glitch or a noise from the digital received signal from which the bit synchronized digital transmission signal is subtracted.

13. The method of claim 11, further comprising:
    resuming the transmitting of succeeding data blocks.

14. The method of claim 9, wherein the detecting of the preset signal comprises:
    subtracting the bit synchronized digital transmission signal from the bit synchronized received signal acquired according to the bit synchronization operation.

15. The method of claim 9, wherein the detecting of the preset signal comprises:
    converting the received signal to a digital received signal;
    performing a bit synchronization operation on the converted digital received signal by using the digital transmission signal;
    subtracting the bit synchronized digital transmission signal from the bit synchronized received signal acquired according to the bit synchronization operation; and
    detecting the preset signal based on a digital received signal from which the bit synchronized digital transmission signal is subtracted.

16. A terminal in a communication system, the terminal comprising:

a transceiver; and a processor configured to control the transceiver to:

receive at least one of a preamble and one or more data blocks transmitted from a transmitting entity, decide that an error occurs on reception of a data block from among the one or more data blocks, and transmit a preset signal for negative acknowledgement of the data block having error to the transmitting entity while the one or more data blocks are being received from the transmitting entity, wherein the preset signal is a sequence not including a preamble signal for bit synchronization, and transmitted to the transmitting entity during an interval in which one data block is transmitted from the transmitting entity and added to a data block in the transmitting entity for bit synchronization.

17. The terminal of claim 16, wherein the transceiver is further configured to:

determine a transmission time at which the preset signal is transmitted by considering a time at which each data block is received to the receiving entity, and transmit the preset signal at the determined transmission time.

18. A method for transmitting and receiving a signal in a terminal in a communication system, the method comprising:

receiving at least one of a preamble and one or more data blocks transmitted from a transmitting entity;

deciding that an error occurs on reception of a data block from among the one or more data blocks; and transmitting a preset signal for negative acknowledgement of the data block having error to the transmitting entity while the one or more data blocks are being received from the transmitting entity, wherein the preset signal is a sequence not including a preamble signal for bit synchronization, and transmitted to the transmitting entity during an interval in which one data block is transmitted from the transmitting entity and added to a data block in the transmitting entity for bit synchronization.

19. The method of claim 18, wherein the transmitting of the preset signal comprises:

determining a transmission time at which the preset signal is transmitted by considering a time at which each data block is received to the receiving entity; and transmitting the preset signal at the determined transmission time.

20. The method of claim 18, wherein the preset signal includes a signature signal with at least one of a period or a sequence signal with a period.

\* \* \* \* \*